United States Patent
Hatada et al.

(10) Patent No.: US 10,576,583 B2
(45) Date of Patent: Mar. 3, 2020

(54) LASER MACHINING DEVICE

(71) Applicant: FANUC CORPORATION, Yamanashi (JP)

(72) Inventors: Masanobu Hatada, Yamanashi (JP); Takayoshi Matsumoto, Yamanashi (JP); Takeshi Nogami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/969,087

(22) Filed: May 2, 2018

(65) Prior Publication Data

US 2018/0333808 A1    Nov. 22, 2018

(30) Foreign Application Priority Data

May 16, 2017   (JP) ................. 2017-097490

(51) Int. Cl.
*B23K 26/36*   (2014.01)
*B23K 26/04*   (2014.01)
(Continued)

(52) U.S. Cl.
CPC ............ *B23K 26/36* (2013.01); *B23K 26/04* (2013.01); *B23K 26/082* (2015.10); *B23K 26/0884* (2013.01)

(58) Field of Classification Search
CPC .. B23K 26/04; B23K 26/082; B23K 26/0884; B23K 26/36
(Continued)

(56) References Cited

U.S. PATENT DOCUMENTS 8,456,523 B2 * 6/2013 Stork genannt Wersborg ............. B23K 26/046
348/90
2006/0060573 A1 3/2006 Becker et al.
(Continued)

FOREIGN PATENT DOCUMENTS

CA   3001967 A1   4/2017
CN   1939640 A    4/2007
(Continued)

OTHER PUBLICATIONS

An Office Action issued by the State Intellectual Property Office dated Mar. 4, 2019, which corresponds to Chinese Patent Application No. 201810430997.2 and is related to U.S. Appl. No. 15/969,087; with English Translation.
(Continued)

*Primary Examiner* — Dana Ross
*Assistant Examiner* — Joseph W Iskra
(74) *Attorney, Agent, or Firm* — Studebaker & Brackett PC

(57) ABSTRACT

A laser machining device includes a scanner head which can scan a laser beam, a movement means for the scanner head, a scanner head control device and a movement control device. In the laser machining device, the scanner head control device controls, based on a machining parameter on a path motion, the scanner head such that the laser beam is scanned in a first direction and a second direction, the scanner head control device includes a distance calculation portion which calculates, from the information of an angle $\theta$ formed by a normal to an item to be machined from the scanner head and the direction of application of the laser beam and a focal length, a difference between a desired machining distance and an actual machining distance and based on the result of the calculation, the movement control device corrects the feedrate of the movement means or the scanner head control device corrects the machining parameter such that the desired machining distance and the actual machining distance are made equal to each other.

3 Claims, 11 Drawing Sheets

(51) Int. Cl.
*B23K 26/082* (2014.01)
*B23K 26/08* (2014.01)

(58) Field of Classification Search
USPC .................................................... 219/121.67
See application file for complete search history.

(56) References Cited

U.S. PATENT DOCUMENTS

| | | |
|---|---|---|
| 2007/0075054 A1 | 4/2007 | Nakamura |
| 2016/0059347 A1* | 3/2016 | Kogel-Hollacher ... B23K 26/03 219/121.74 |
| 2017/0072506 A1 | 3/2017 | Kusaka |

FOREIGN PATENT DOCUMENTS

| | | | |
|---|---|---|---|
| CN | 1939640 | * | 7/2009 |
| CN | 103157909 A | | 6/2013 |
| CN | 205496799 U | | 8/2016 |
| JP | S63-204407 A | | 8/1988 |
| JP | S63-223806 A | | 9/1988 |
| JP | 2007-021551 A | | 2/2007 |
| JP | 2007-098416 A | | 4/2007 |
| JP | 2012-218030 A | | 11/2012 |
| JP | 2013-086173 A | | 5/2013 |
| WO | 2017/068836 A1 | | 4/2017 |
| WO | WO2017068836 | * | 4/2017 |

OTHER PUBLICATIONS

An Office Action mailed by the German Patent and Trade Mark Office dated Oct. 4, 2019, which corresponds to German Patent Application No. DE102018207358.9 and is related to U.S. Appl. No. 15/969,087.

* cited by examiner

F: MACHINING SPEED
P: PITCH
W: SWING WIDTH

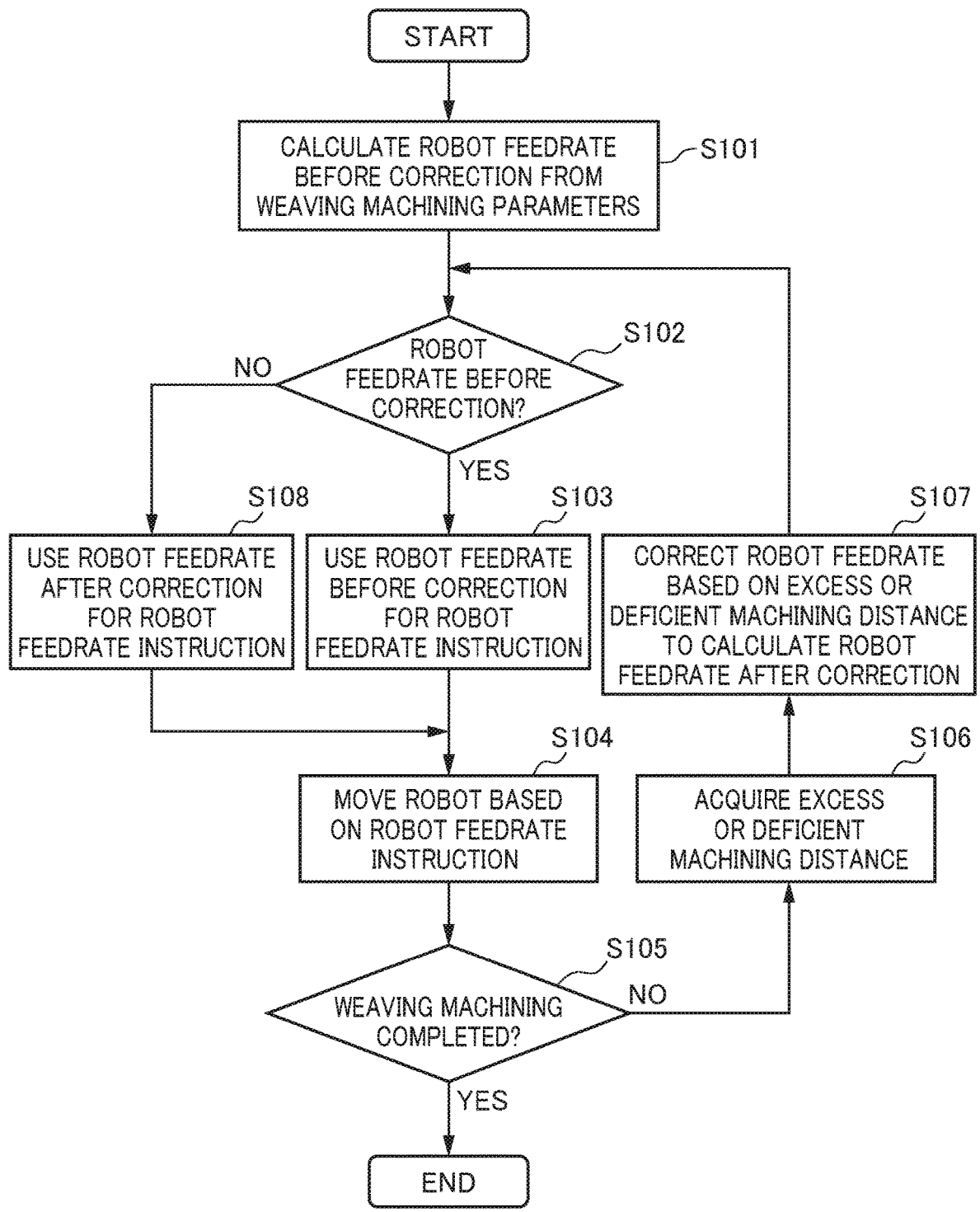

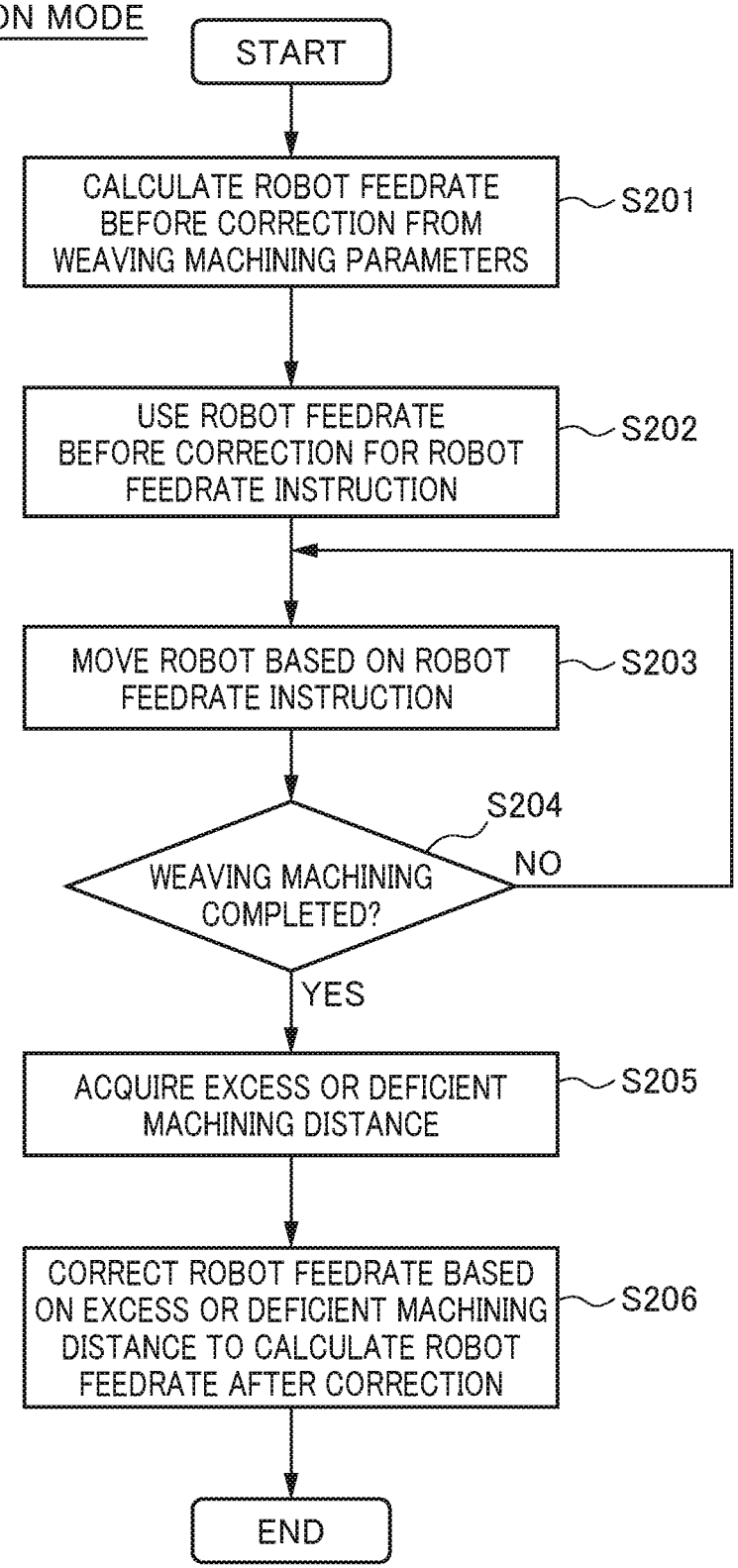

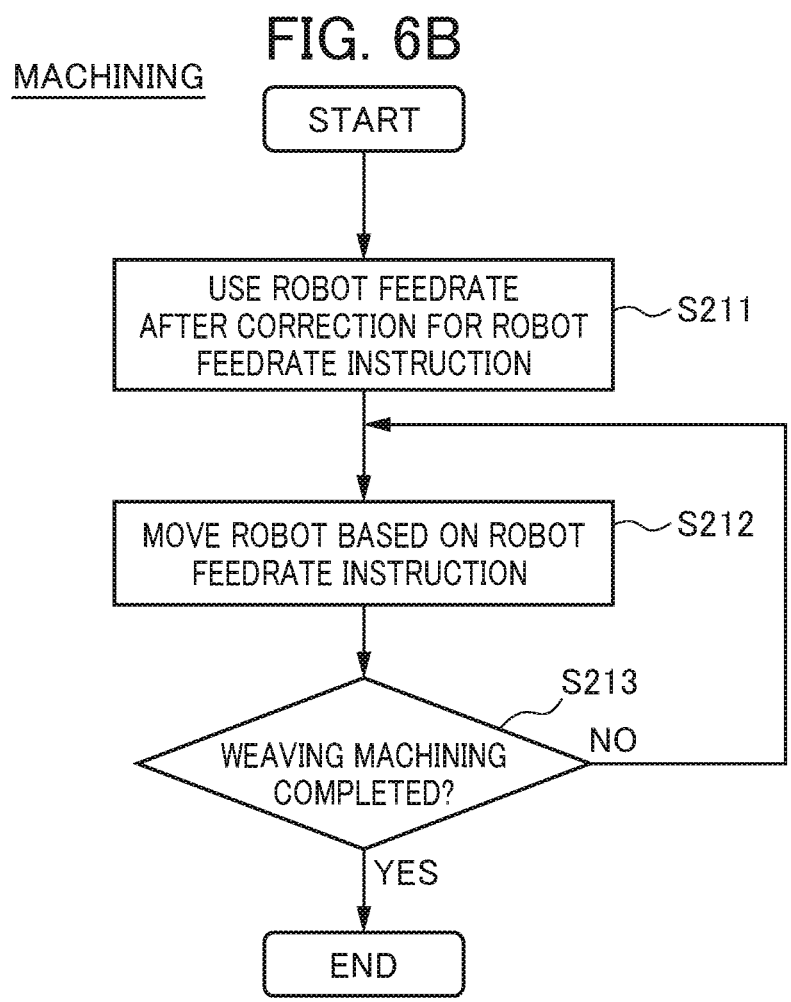

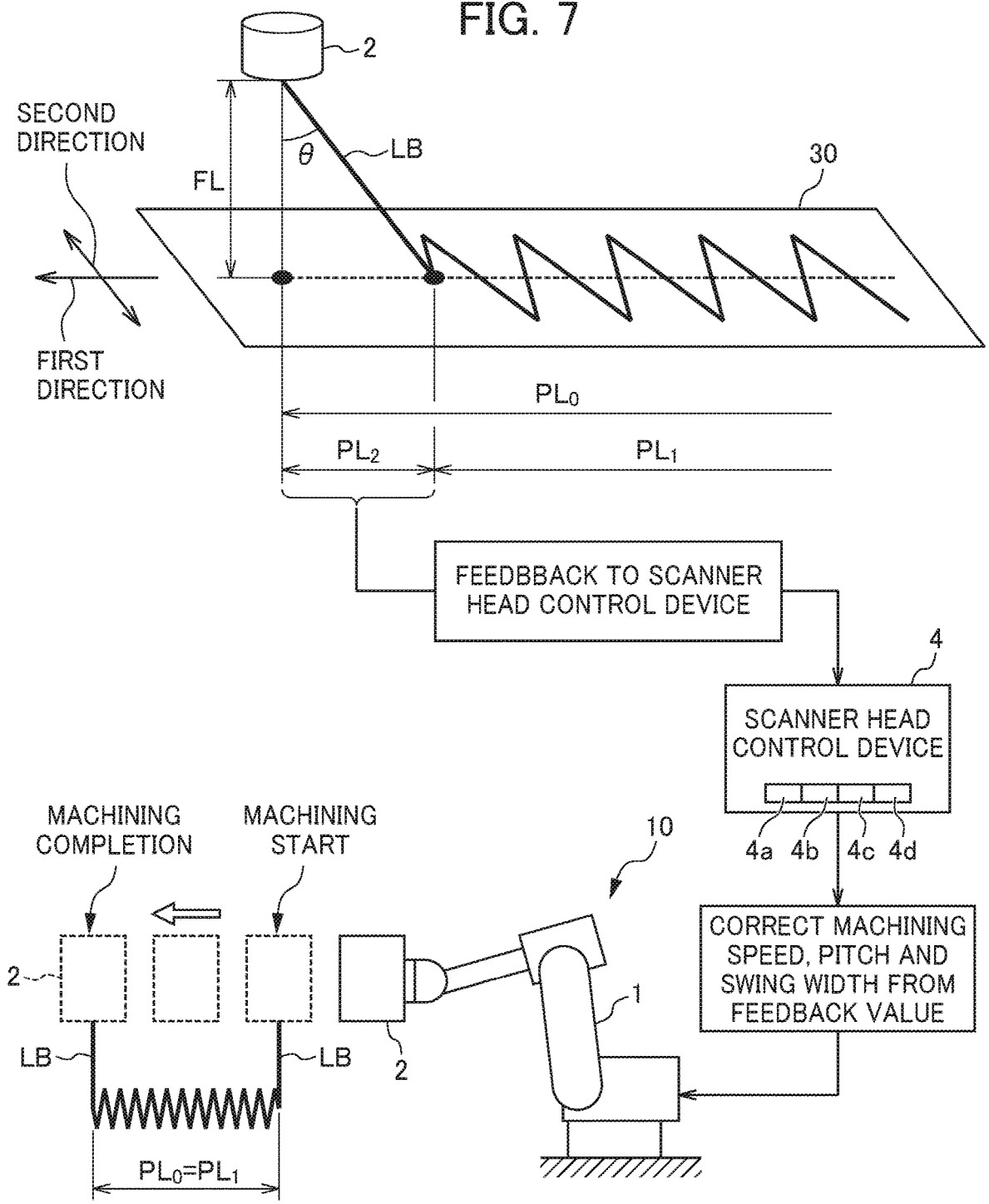

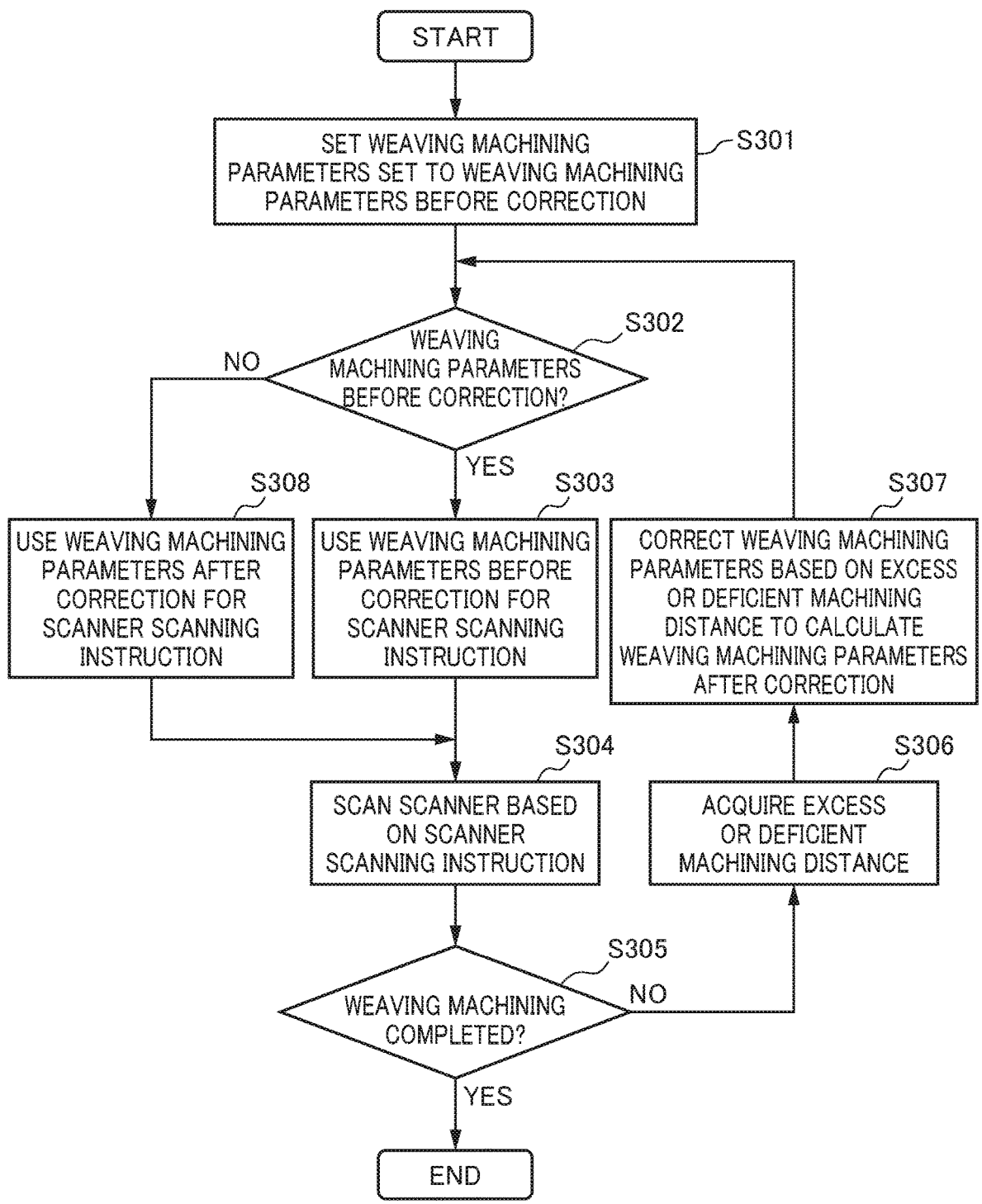

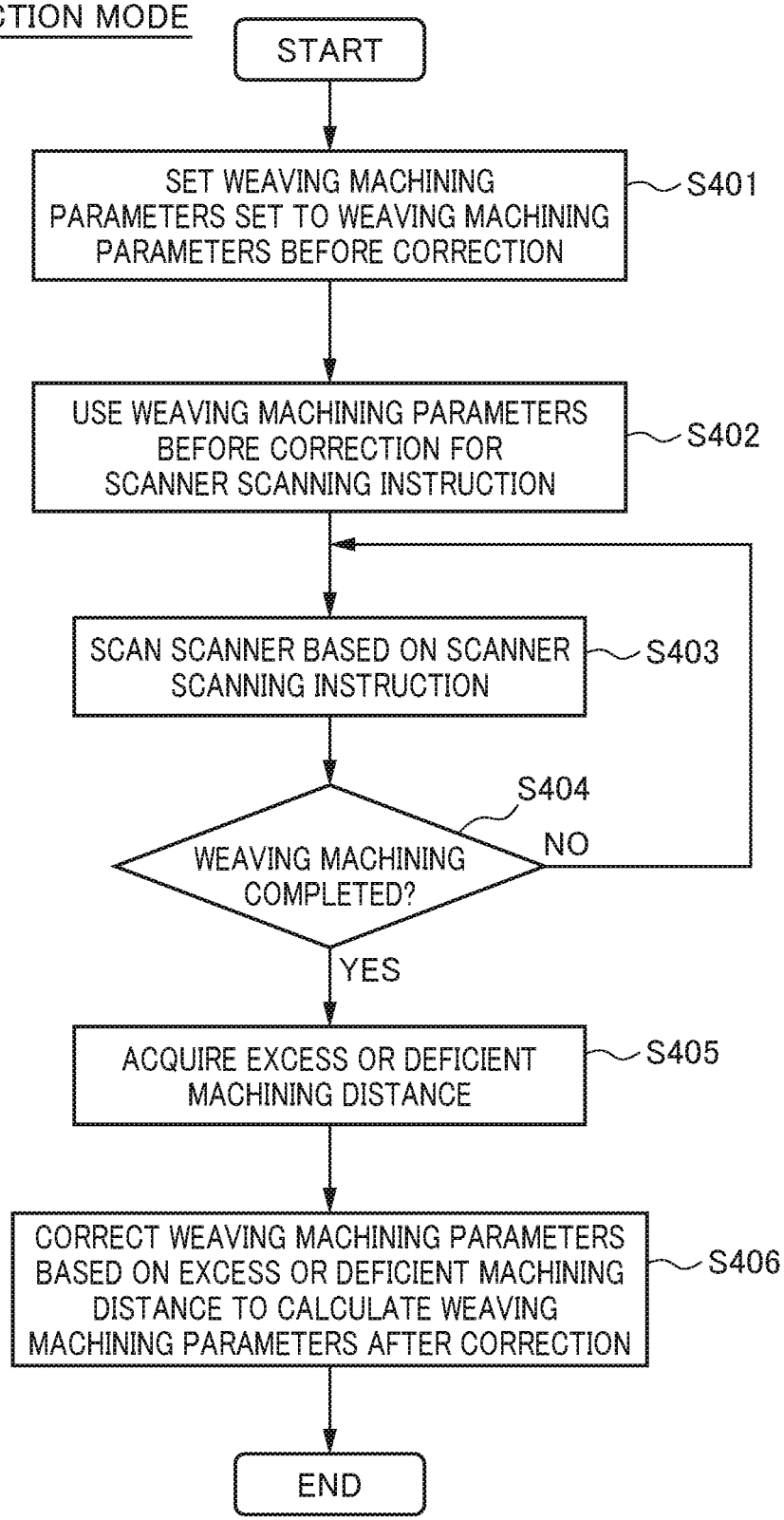

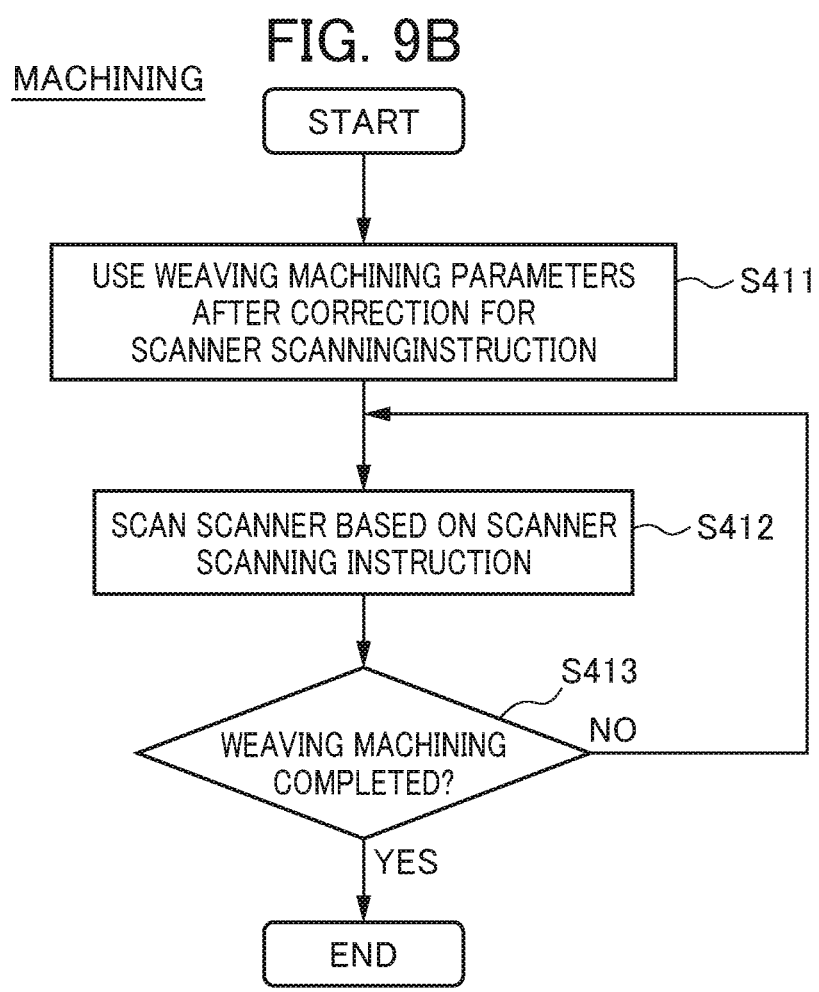

LASER MACHINING DEVICE

This application is based on and claims the benefit of priority from Japanese Patent Application No. 2017-097490, filed on 16 May 2017, the content of which is incorporated herein by reference.

BACKGROUND OF THE INVENTION

Field of the Invention

The present invention relates to laser machining devices.

Related Art

Conventionally, a laser machining device is known which includes a scanner head capable of scanning a laser beam (see, for example, Patent Documents 1 to 3). The laser machining device as described above scans, while moving the scanner head, the laser beam over an item to be machined, and thereby can perform laser machining.

Patent Document 1: Japanese Unexamined Patent Application, Publication No. S63-204407
Patent Document 2: Japanese Unexamined Patent Application, Publication No. S63-223806
Patent Document 3: Japanese Unexamined Patent Application, Publication No. 2012-218030

SUMMARY OF THE INVENTION

The laser machining device which scans, while moving the scanner head, the laser beam scans the laser beam based on predetermined machining parameters, and calculates a feedrate for movement of the scanner head from the machining parameters so as to control the movement of the scanner head based on the result of the calculation of the feedrate. However, the laser machining device as described above has a problem which will be as described below.

FIGS. 10 and 11 show an example where a scanner head 101 is provided at a tip portion of a robot 100 and where the movement of the scanner head 101 is performed by the robot 100. Here, when as shown in FIG. 10, a laser beam LB is scanned from the scanner head 101 so as to perform weaving machining on the machined surface of an item to be machined, an actual machining distance $PL_1$ obtained at the time of completion of the machining may be shorter than a desired machining distance $PL_0$. It can be considered that this is because, for example, the operation of a galvano mirror which scans the laser beam LB is decelerated at the end of the weaving. On the other hand, as shown in FIG. 11, the actual machining distance $PL_1$ obtained at the time of completion of the machining may be longer than the desired machining distance $PL_0$. It can be considered that this is because, for example, the robot 100 is decelerated at a corner portion. As described above, in the conventional laser machining device, when the laser machining is performed, the desired machining distance and the actual machining distance may differ from each other, with the result that there is room for improvement.

Hence, an object of the present invention is to provide a laser machining device that can perform highly accurate laser machining in which a desired machining distance and an actual machining distance are equal to each other.

(1) A laser machining device (for example, a laser machining device 10 which will be described later) according to the present invention includes: a scanner head (for example, a scanner head 2 which will be described later) which can scan a laser beam; a movement means (for example, a robot 1 which will be described later) which moves the scanner head at a predetermined feedrate; a scanner head control device (for example, a scanner head control device 4 which will be described later) which controls the scanner head; and a movement control device (for example, a robot control device 3 which will be described later) which controls the feedrate of the movement means, where the scanner head control device controls, based on a machining parameter on a path motion, the scanner head such that the laser beam is scanned in a first direction in which the movement means moves the scanner head and a second direction perpendicular thereto, the scanner head control device includes a distance calculation portion (for example, a distance calculation portion 4c which will be described later) which acquires information of an angle θ formed by a normal to an item to be machined from the scanner head and a direction of application of the laser beam and a focal length so as to calculate a difference between a desired machining distance and an actual machining distance and based on a result of the calculation of the distance calculation portion, the movement control device performs control so as to correct the feedrate of the movement means or the scanner head control device performs control so as to correct the machining parameter such that the desired machining distance and the actual machining distance are made equal to each other.

(2) Preferably, the distance calculation portion of the scanner head control device calculates the difference between the desired machining distance and the actual machining distance per predetermined period of interpolation in laser machining, and based on the result of the calculation of the distance calculation portion, the movement control device performs, per the period of interpolation, control so as to correct the feedrate of the movement means or the scanner head control device performs, per the period of interpolation, control so as to correct the machining parameter such that the desired machining distance and the actual machining distance are made equal to each other.

(3) Preferably, the distance calculation portion of the scanner head control device calculates, before laser machining, the difference between the desired machining distance and the actual machining distance, and based on the result of the calculation of the distance calculation portion, the movement control device performs, before the laser machining, control so as to correct the feedrate of the movement means or the scanner head control device performs, before the laser machining, control so as to correct the machining parameter such that the desired machining distance and the actual machining distance are made equal to each other.

According to the present invention, it is possible to provide a laser machining device that can perform highly accurate laser machining in which a desired machining distance and an actual machining distance are equal to each other.

BRIEF DESCRIPTION OF THE DRAWINGS

FIG. 5 is a diagram showing an example of a flowchart illustrating a correction operation in a first aspect of the first control form;

FIG. 6A is a diagram showing an example of a flowchart illustrating a correction operation in a correction mode in a second aspect of the first control form;

FIG. 6B is a diagram showing an example of a flowchart illustrating a correction operation in a machining mode in the second aspect of the first control form;

FIG. 7 is a diagram showing an outline of a second control form of the correction operation in the laser machining device according to the embodiment of the present invention;

FIG. 8 is a diagram showing an example of a flowchart illustrating a correction operation in a first aspect of the second control form;

FIG. 9A is a diagram showing an example of a flowchart illustrating a correction operation in a correction mode in a second aspect of the second control form;

FIG. 9B is a diagram showing an example of a flowchart illustrating a correction operation in a machining mode in the second aspect of the second control form;

DETAILED DESCRIPTION OF THE INVENTION

Embodiments of the present invention will be described below with reference to drawings.

[Overall Configuration of Laser Machining Device]

Figure 1:
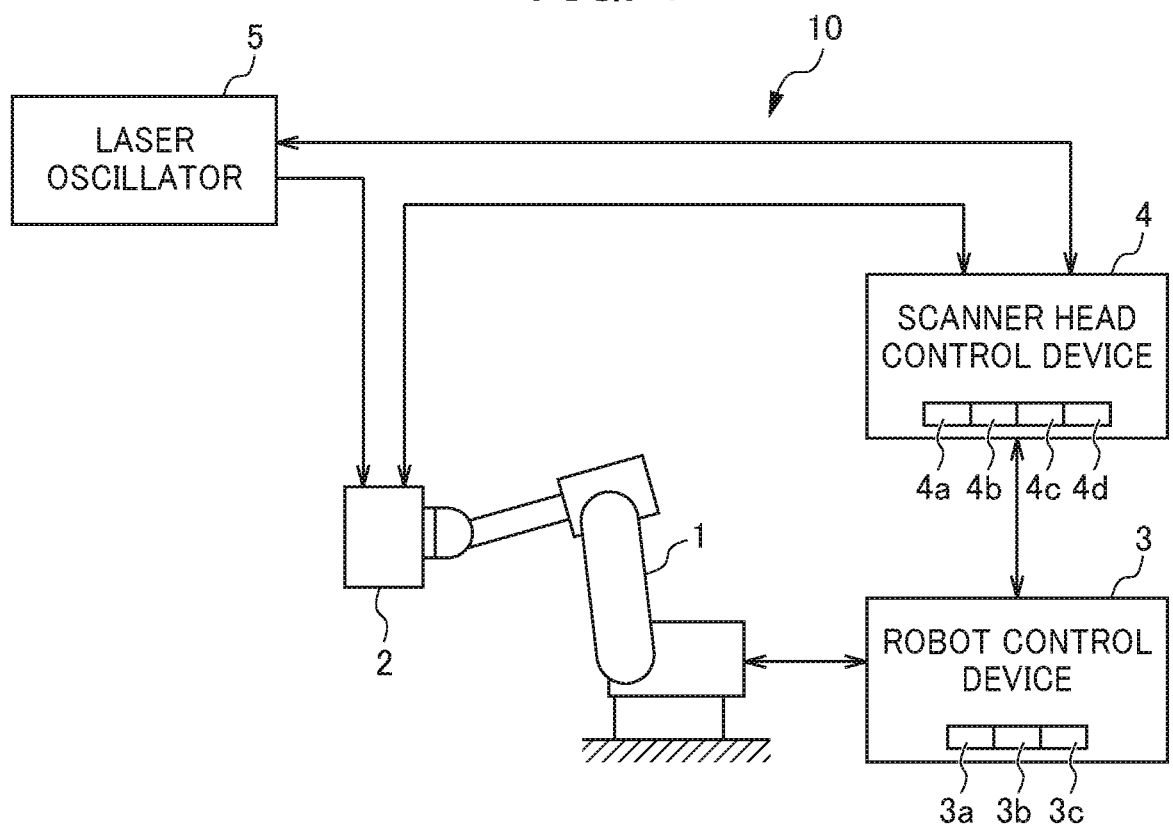
FIG. 1 is a block diagram showing the overall configuration of a laser machining device according to an embodiment of the present invention.

FIG. 1 is a block diagram showing the overall configuration of a laser machining device according to the embodiment of the present invention. The laser machining device 10 includes a robot 1, a scanner head 2, a robot control device 3, a scanner head control device 4 and a laser oscillator 5.

The robot 1 is an articulated robot having a plurality of joints, and includes the scanner head 2 at a tip portion. The robot 1 includes a plurality of unillustrated motors for driving the individual joints. The robot 1 is formed so as to be able to move the scanner head 2 by the drive of the individual motors with respect to the machined surface of an item to be machined which is not shown in FIG. 1. The robot 1 is an example of a movement means in the present invention.

Figure 2:
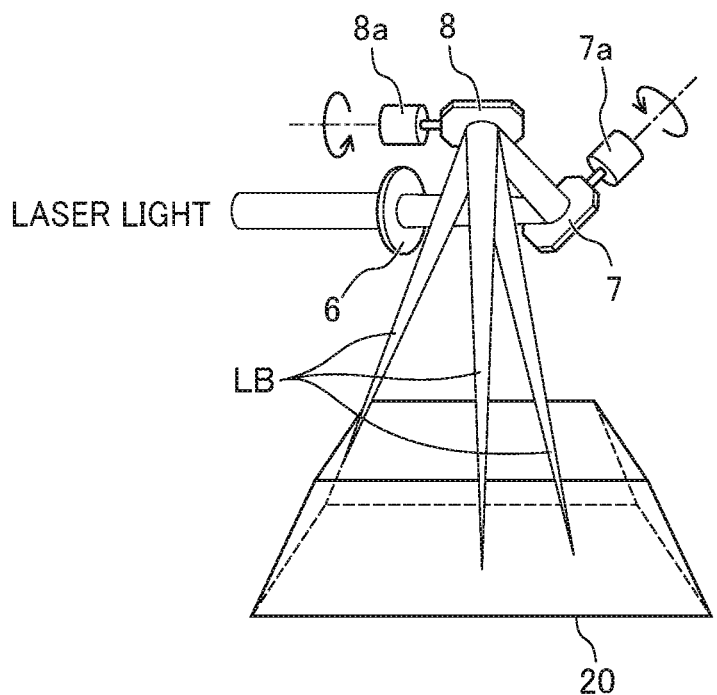
FIG. 2 is a diagram illustrating the internal configuration of a scanner head in the laser machining device shown in FIG. 1.

The scanner head 2 is formed so as to be able to scan a laser beam LB over the machined surface of the item to be machined by receiving the supply of laser light from the laser oscillator 5. Specifically, As shown in FIG. 2, the scanner head 2 includes a focusing lens 6 which focuses the laser light and a plurality of galvano mirrors 7 and 8 therewithin. The galvano mirrors 7 and 8 are independently rotated by motors 7a and 8a, respectively and thus the angles thereof can be changed. The laser light supplied from the laser oscillator 5 to the scanner head 2 is focused by the focusing lens 6, and thereafter sequentially enters the galvano mirrors 7 and 8. The galvano mirrors 7 and 8 are respectively rotated by the motors 7a and 8a so as to change the direction of reflection of the laser light. In this way, the scanner head 2 can scan the laser beam LB over the machined surface of the item to be machined. Reference numeral 20 in FIG. 2 represents a machining area to which the laser beam LB is applied.

The robot control device 3 outputs a robot feedrate instruction to the robot 1 so as to control the drive of the motors. The motors are driven by the robot feedrate instruction, and thus the robot 1 is moved at a robot feedrate corresponding to the drive of the individual motors so as to move the scanner head 2 at the tip portion. The information of the robot feedrate can be output to the scanner head control device 4. Reference numeral 3a in FIG. 1 represents a control portion included in the robot control device 3. The control portion 3a performs control on the drive of the motors in the robot 1 and the like. The robot control device 3 is an example of a movement control device in the present invention.

The scanner head control device 4 controls the supply of the laser light from the laser oscillator 5 to the scanner head 2. The scanner head control device 4 outputs a scanner scanning instruction to the scanner head 2 so as to control the rotation of the motors 7a and 8a, and thereby changes the angles of the galvano mirrors 7 and 8. In this way, the scanning of the laser beam LB from the scanner head 2 is controlled. When the direction in which at the time of the laser machining, the robot control device 3 moves the scanner head 2 is assumed to be a first direction, the scanner head 2 is formed to be able to scan, by the rotation of the galvano mirrors 7 and 8, the laser beam LB in the first direction and a second direction perpendicular to the first direction. Reference numeral 4a in FIG. 1 represents a control portion included in the scanner head control device 4. The control portion 4a performs control on the drive of the motors 7a and 8a in the scanner head 2 and the like.

Figure 3:
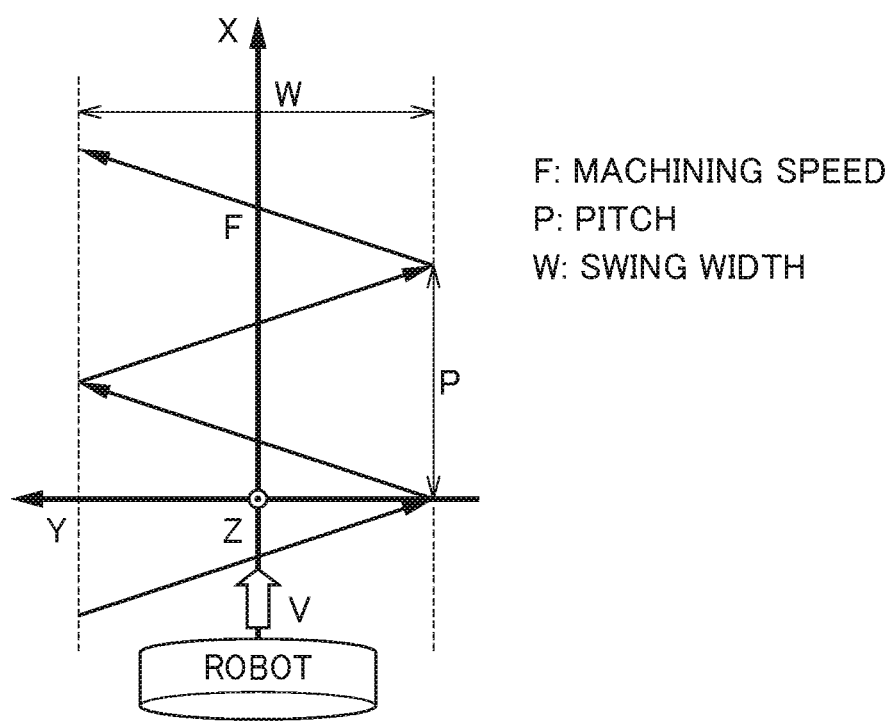
FIG. 3 is a diagram illustrating an example of machining parameters.

The scanner scanning instruction is an instruction based on predetermined machining parameters on the path motion of the laser beam LB. Specifically, the laser machining on the item to be machined is performed by scanning, while moving the scanner head 2 in the first direction, the laser beam LB such that the direction of reflection of the laser light is changed by the galvano mirrors 7 and 8 to the second direction and that a path is formed by a desired movement over the machined surface of the item to be machined. Here, machining parameters necessary for forming the path by the desired movement of the laser beam LB are the machining parameters on the path motion. For example, when weaving machining is performed by a zigzag-shaped path shown in FIG. 3, a machining speed F, a pitch P and a swing width W of the laser beam are an example of the machining parameters on the path motion. Hence, when the machining is performed on the item to be machined, the scanner head control device 4 outputs the scanner scanning instruction to the scanner head 2 based on the predetermined machining parameters on the path motion. In this way, the galvano mirrors 7 and 8 are controlled to rotate such that the laser beam LB can form the path in the first direction and the second direction by the desired movement. In FIG. 3, a direction along an X axis is the first direction, and a direction along a Y axis is the second direction.

The machining parameters on the path motion are previously set in, for example, a storage portion 4b included in the scanner head control device 4. The information of the machining parameters is also output to the robot control device 3. The robot control device 3 calculates, based on the machining parameters output from the scanner head control device 4, the robot feedrate V (see FIG. 3) when the robot 1 moves the scanner head 2. The robot control device 3 includes a feedrate calculation portion 3*b* for calculating the robot feedrate V. The calculated robot feedrate V is set in a storage portion 3*c* included in the robot control device 3. The robot control device 3 outputs, based on the robot feedrate V set in the storage portion 3*c*, the robot feedrate instruction to the robot 1, and drives the motors of the robot 1 so as to move the scanner head 2 in the first direction.

[Correction Operation of Laser Machining Device]

A correction operation of making a desired machining distance and an actual machining distance equal to each other in the laser machining device 10 will then be described.

Figure 4:
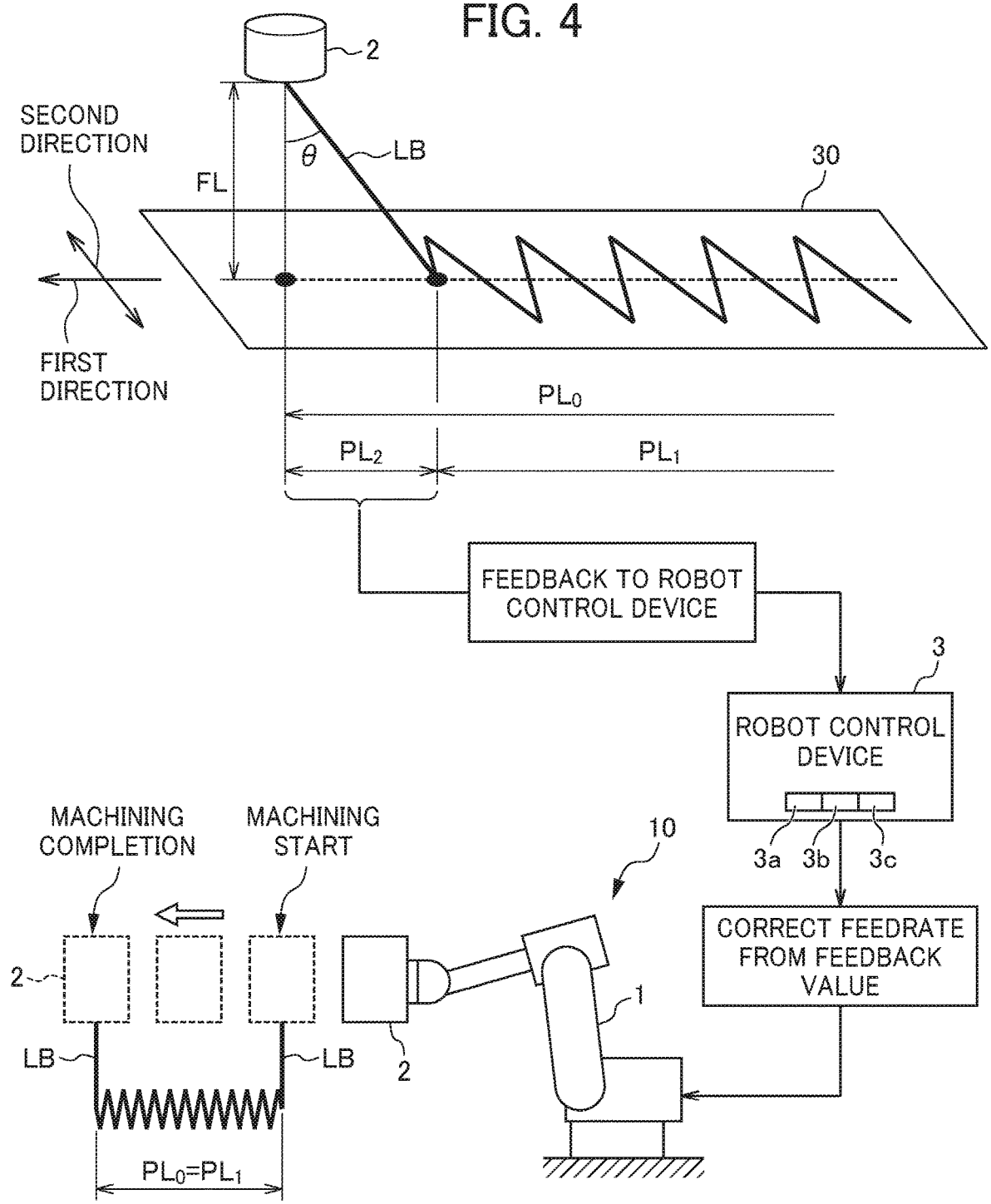
FIG. 4 is a diagram showing an outline of a first control form of a correction operation in the laser machining device according to the embodiment of the present invention.
Figure 10:
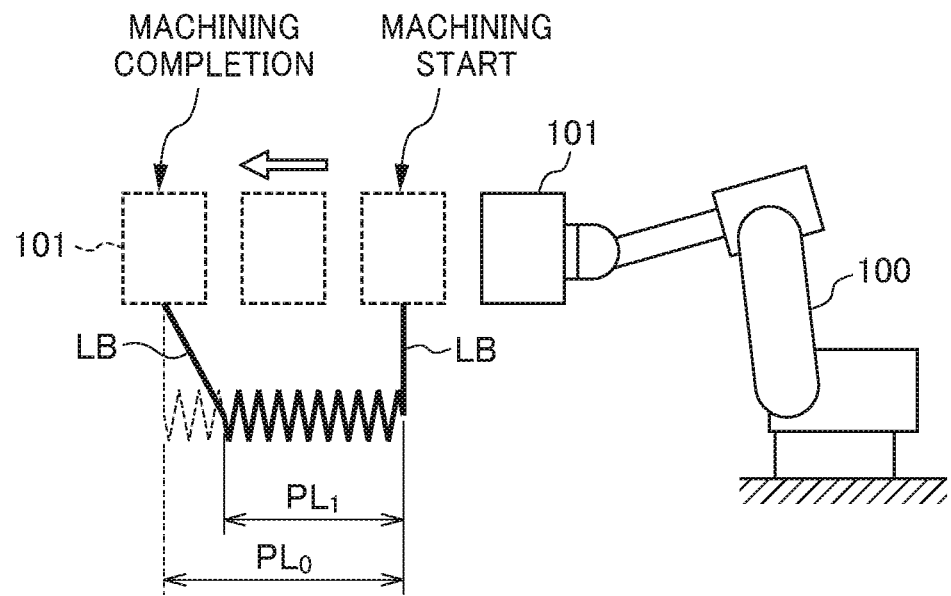
FIG. 10 is a diagram illustrating an example where in a conventional laser machining device, an actual machining distance is shorter than a desired machining distance.
Figure 11:
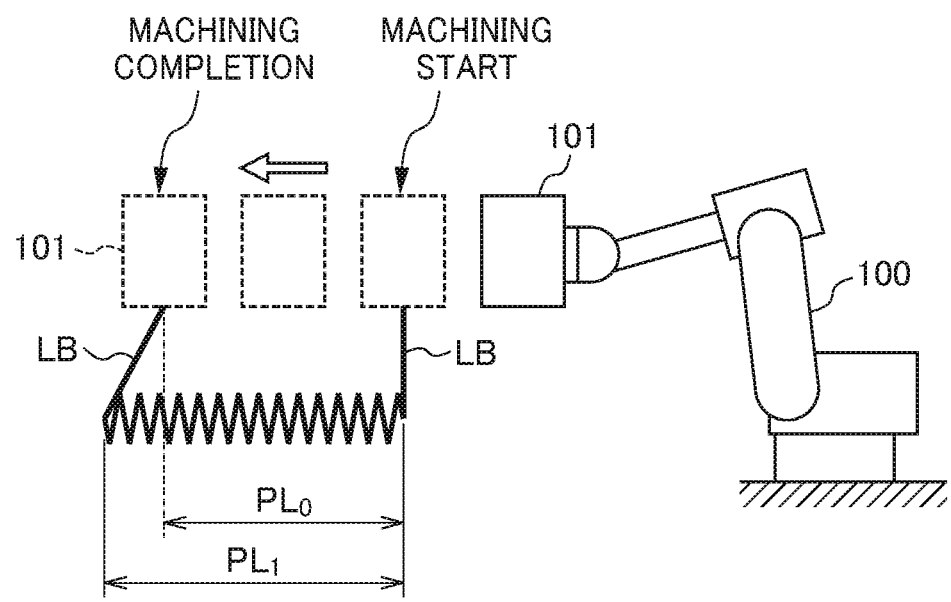
FIG. 11 is a diagram illustrating an example where in the conventional laser machining device, the actual machining distance is longer than the desired machining distance.

First, the desired machining distance include not only a machining distance which it is necessary to reach when the laser machining is completely finished but also a machining distance which it is necessary to reach at an arbitrary time in the middle of the laser machining. That the desired machining distance is equal to the actual machining distance indicates a state where when the robot 1 is seen laterally, the laser beam is applied vertically to the machined surface of the item to be machined. Hence, for example, as shown in FIG. 4, it is possible to determine, from the angle of application of the laser beam LB to the machined surface 30 of the item to be machined, a difference between the desired machining distance $PL_0$ and the actual machining distance $PL_1$, that is, an excess or deficient machining distance $PL_2$. The excess or deficient machining distance $PL_2$ can be acquired by an angle $\theta$ formed by a normal to the machined surface 30 of the item to be machined from the scanner head 2 and the direction of application of the laser beam LB and the information of a focal length FL.

The angle $\theta$ can be acquired from the rotation angle information of the galvano mirrors 7 and 8 within the scanner head 2. The rotation angle information can be the number of steps in stepping motors, for example, when as the motors 7*a* and 8*a*, stepping motors are used. The rotation angle information can be the number of pulses in rotary encoders, for example, when as the motors 7*a* and 8*a*, rotary encoders are used. The focal length FL is a distance between the scanner head 2 and the machined surface 30 of the item to be machined and can be previously stored in, for example, the storage portion 4*b* of the scanner head control device 4.

As shown in FIG. 1, the scanner head control device 4 includes a distance calculation portion 4*c* for calculating the excess or deficient machining distance $PL_2$. The distance calculation portion 4*c* calculates the excess or deficient machining distance $PL_2$ from the angle $\theta$ and the information of the focal length FL acquired. As one aspect of timing at which the excess or deficient machining distance $PL_2$ is calculated, the calculation can be performed per predetermined period of interpolation in the laser machining. As another aspect, when a correction mode is set before the laser machining, the calculation can be performed in the correction mode. The information of the calculated excess or deficient machining distance $PL_2$ is stored in the storage portion 4*b* of the scanner head control device 4.

In the laser machining device 10, the correction operation of making the desired machining distance $PL_0$ and the actual machining distance $PL_1$ equal to each other is performed, based on the information of the excess or deficient machining distance $PL_2$ acquired as described above, by interpolating the excess or deficient machining distance $PL_2$ such that the desired machining distance $PL_0$ and the actual machining distance $PL_1$ are made equal to each other. However, the correction in the present invention is not limited to the correction in which the desired machining distance $PL_0$ and the actual machining distance $PL_1$ are made exactly equal to each other, and as long as machining accuracy is not significantly affected, a slight displacement to the positive side or the negative side may be made. Hence, in the present invention, that the desired machining distance $PL_0$ and the actual machining distance $PL_1$ are equal to each other is not necessarily limited to that both the distances are exactly equal to each other.

In the specific correction operation in the present invention, there are a first control form in which the robot control device 3 corrects the robot feedrate so as to perform control and a second control form in which the scanner head control device 4 corrects the machining parameters on the path motion so as to perform control. The individual control forms will be described below.

<First Control Form in Correction Operation>

FIG. 4 shows an outline of the first control form of the correction operation in the laser machining device according to the embodiment of the present invention. Here, a case is illustrated where the weaving machining is performed based on the weaving machining parameters (the machining speed F, the pitch P and the swing width W) described previously such that the laser beam LB forms the zigzag-shaped path in the machined surface 30 of the item to be machined.

In the first control form, the distance calculation portion 4*c* of the scanner head control device 4 calculates the excess or deficient machining distance $PL_2$ and feeds back the result of the calculation to the robot control device 3. Then, the robot control device 3 automatically corrects, based on the information of the excess or deficient machining distance $PL_2$ fed back, the robot feedrate such that the desired machining distance $PL_0$ and the actual machining distance $PL_1$ are made equal to each other, and uses the corrected robot feedrate so as to control the robot 1. Since as described above, in the laser machining device 10, the robot control device 3 automatically corrects the robot feedrate so as to interpolate the excess or deficient machining distance $PL_2$, the laser machining device 10 can perform highly accurate laser machining in which the desired machining distance $PL_0$ and the actual machining distance $PL_1$ are equal to each other.

The specific method of correcting the robot feedrate is not particularly limited. For example, the corrected robot feedrate can be obtained by performing computation from the excess or deficient machining distance $PL_2$ and the machining parameters based on a predetermined correction computation formula previously prepared in the feedrate calculation portion 3*b*. The corrected robot feedrate can also be obtained based on a data table in which the excess or deficient machining distance $PL_2$ and the machining parameters are associated with the correction values of the robot feedrate corresponding thereto. The data table can also be prepared in, for example, the feedrate calculation portion 3*b*.

As the aspect of the specific correction operation in the first control form, there are a first aspect in which the correction operation is repeatedly performed per predetermined period of interpolation in the laser machining and a second aspect in which the correction operation is performed in the correction mode before the actual laser machining. The individual aspects will be described below.

(First Aspect in First Control Form)

A correction operation in the first aspect of the first control form will be described with reference to a flowchart shown in FIG. 5. FIG. 5 shows a case where the correction operation is performed per predetermined period of interpolation. This correction operation is performed by the control portion 3*a* of the robot control device 3.

When the laser machining device 10 is started up, the robot control device 3 calculates the robot feedrate in the feedrate calculation portion 3b based on the weaving machining parameters output from the scanner head control device 4 (step S101). Then, the robot control device 3 determines whether or not the calculated robot feedrate is the rate before the correction (step S102). Here, the robot feedrate is the robot feedrate before the correction yet. Hence, the robot control device 3 uses the robot feedrate calculated in step S101 so as to output the robot feedrate instruction to the robot 1 (step S103). In this way, the robot 1 is moved so as to move the scanner head 2 (step S104). Thereafter, the laser machining device 10 performs, by the movement of the scanner head 2 and the scanning of the laser beam LB based on the weaving machining parameters, the weaving machining so as to form a predetermined path in the machined surface 30 of the item to be machined.

In the first aspect, while the weaving machining is being continued, the correction operation is performed per predetermined period of interpolation. After the start of the weaving machining, the robot control device 3 determines whether or not the weaving machining is completed (step S105). The completion of the weaving machining can be determined by, for example, the arrival of the robot 1 at a weaving machining completion position previously stored in the robot control device 3. Then, when it is determined that the weaving machining is not completed, at the subsequent predetermined period of interpolation, the robot control device 3 outputs, to the scanner head control device 4, an instruction to calculate the excess or deficient machining distance $PL_2$ at present. When the scanner head control device 4 receives this instruction, the scanner head control device 4 calculates, in the distance calculation portion 4c, the excess or deficient machining distance $PL_2$ at present. The result of the calculation is output to the robot control device 3. In this way, the robot control device 3 acquires the information of the excess or deficient machining distance $PL_2$ at present (step S106).

Then, the robot control device 3 corrects, based on the information of the excess or deficient machining distance $PL_2$, in the feedrate calculation portion 3b, the robot feedrate such that the predetermined desired machining distance $PL_0$ and the actual machining distance $PL_2$ are made equal to each other. Then, the robot control device 3 calculates a new robot feedrate after the correction (step S107). The robot feedrate before the correction stored in the storage portion 3c is rewritten to the robot feedrate after the correction.

Then, the process is returned again to step S102. Here, it is determined that the robot feedrate is not the robot feedrate before the correction. Hence, the robot control device 3 uses the robot feedrate after the correction for the robot feedrate instruction which is output to the robot 1 (step S108). Thereafter, the processing from step S104 is repeated. In this way, the robot 1 is moved at the robot feedrate after the correction so as to move the scanner head 2 at the feedrate after the correction. The correction operation described above is repeatedly performed per predetermined period of interpolation while in step S105, the weaving machining is determined not to be completed. When in step S105, the weaving machining is determined to be completed, the robot control device 3 completes the correction operation.

In the laser machining device 10 according to the first aspect of the first embodiment, in particular, while the laser machining is being performed, the robot control device 3 automatically corrects the robot feedrate and thereby can make the desired machining distance $PL_0$ and the actual machining distance $PL_1$ equal to each other. Hence, even when a factor which varies the machining accuracy in the laser machining occurs, this laser machining device 10 can easily cope with the factor, with the result that the laser machining device 10 can constantly perform highly accurate laser machining.

For example, the information of the period of interpolation can be set as preset values in an unillustrated interpolation period setting portion or the like in the robot control device 3. A configuration may be adopted in which the period of interpolation can be arbitrarily changed by an instruction of an operator.

(Second Aspect in First Control Form)

A correction operation in the second aspect of the first control form will then be described with reference to flowcharts shown in FIGS. 6A and 6B. FIG. 6A shows an example of the flowchart in the correction mode in which the correction operation is performed before the actual laser machining. FIG. 6B shows an example of the flowchart in a machining mode in which the laser machining is actually performed after the correction is made in the correction mode. This correction operation is performed by the control portion 3a of the robot control device 3.

As shown in FIG. 6A, when the correction mode is entered, the robot control device 3 calculates, based on the weaving machining parameters output from the scanner head control device 4, in the feedrate calculation portion 3b, the robot feedrate for moving the scanner head 2 (step S201). Here, the robot feedrate is the robot feedrate before the correction yet. Hence, the robot control device 3 uses the calculated robot feedrate so as to output the robot feedrate instruction to the robot 1 (step S202). In this way, the robot 1 is moved so as to move the scanner head 2 (step S203). Thereafter, the laser machining device 10 performs, by the movement of the scanner head 2 and the scanning of the laser beam LB based on the weaving machining parameters, the weaving machining so as to form a predetermined path in the machined surface 30 of the item to be machined. In this weaving machining, the laser beam LB is scanned so as to form the same path as when the laser machining is actually performed on the item to be machined. However, since this weaving machining is weaving machining which serves as the correction operation, as the item to be machined here, not the item to be machined on which the laser machining is actually performed but an item to be machined for a test can be used.

After the start of the weaving machining, the robot control device 3 determines whether or not the weaving machining is completed (step S204). When it is determined that the weaving machining is not completed, the robot control device 3 repeats the processing from step S203. On the other hand, when it is determined that the weaving machining is completed, the robot control device 3 outputs, to the scanner head control device 4, an instruction to calculate the excess or deficient machining distance $PL_2$. When the scanner head control device 4 receives this instruction, the scanner head control device 4 calculates, in the distance calculation portion 4c, the excess or deficient machining distance $PL_2$. The result of the calculation is output to the robot control device 3. In this way, the robot control device 3 acquires the information of the excess or deficient machining distance $PL_2$ (step S205).

Then, the robot control device 3 corrects, based on the information of the excess or deficient machining distance $PL_2$, in the feedrate calculation portion 3b, the robot feedrate such that the predetermined desired machining distance $PL_0$ and the actual machining distance $PL_1$ are made equal to each other. Then, the robot control device 3 calculates a new robot feedrate after the correction (step S206). The robot feedrate before the correction stored in the storage portion 3c is rewritten to the robot feedrate after the correction. Then, the robot control device 3 completes the correction mode.

In this way, the robot feedrate after the correction is obtained, and then the mode is transferred to the machining mode in FIG. 6B. The machining mode is a mode in which the laser machining is actually performed on the item to be machined. In the machining mode, the robot control device 3 uses the robot feedrate after the correction obtained in the correction mode for the robot feedrate instruction which is output to the robot 1 (step S211). In this way, the robot 1 is moved at the robot feedrate after the correction so as to move the scanner head 2 (step S212). Then, the laser machining device 10 performs, by the movement of the scanner head 2 and the scanning of the laser beam LB based on the weaving machining parameters, the weaving machining as an actual machining operation so as to form a predetermined path in the machined surface 30 of the item to be machined.

Thereafter, the robot control device 3 determines whether or not the weaving machining is completed (step S213). While it is determined that the weaving machining is not completed, the robot control device 3 repeats the processing from step S212. When it is determined that the weaving machining is completed, the robot control device 3 completes the operation.

In the laser machining device 10 according to the second aspect of the first embodiment, in particular, before the laser machining, the robot control device 3 automatically corrects the robot feedrate and thereby can make the desired machining distance $PL_0$ and the actual machining distance $PL_1$ equal to each other. Hence, this laser machining device 10 can perform highly accurate laser machining from the beginning of the start of the laser machining.

For example, a configuration may be adopted in which the correction mode can be arbitrarily performed as a result of the operator selecting an unillustrated correction mode selection switch or the like provided in the robot control device 3 or in which the correction mode is automatically performed with predetermined timing such as when the laser machining device 10 is started up.

<Second Control Form in Correction Operation>

FIG. 7 shows an outline of a second control form of the correction operation in the laser machining device according to the embodiment of the present invention. Here, the case is also illustrated where the weaving machining is performed based on the weaving machining parameters (the machining speed F, the pitch P and the swing width W) described previously such that the laser beam LB forms the zigzag-shaped path in the machined surface 30 of the item to be machined.

In the second control form, the scanner head control device 4 calculates the excess or deficient machining distance $PL_2$. The result of the calculation is fed back to the scanner head control device 4 itself. Then, the scanner head control device 4 automatically corrects, based on the information of the excess or deficient machining distance $PL_2$ fed back, the machining parameters (the machining speed F, the pitch P and the swing width W) on the path motion such that the desired machining distance $PL_0$ and the actual machining distance $PL_1$ are made equal to each other. The scanner head control device 4 uses the corrected machining parameters so as to control the scanner head 2. Here, the correction of the robot feedrate is not performed in the robot control device 3. In this way, the laser machining device 10 performs the correction operation such that the scanner head control device 4 automatically interpolates the excess or deficient machining distance $PL_2$. Hence, the laser machining device 10 can perform highly accurate laser machining in which the desired machining distance $PL_0$ and the actual machining distance $PL_1$ are equal to each other.

As shown in FIG. 7, the scanner head control device 4 according to the second control form further includes a parameter correction portion 4d for correcting the machining parameters. In the correction of the machining parameters, as shown in FIG. 3, when a plurality of parameters such as the machining speed F, the pitch P and the swing width W are set, one of them may be corrected or two or more or all of them may be corrected.

The specific method of correcting the machining parameters is not particularly limited. For example, the corrected machining parameters can be obtained by performing computation from the excess or deficient machining distance $PL_2$ based on a predetermined correction computation formula previously prepared in the parameter correction portion 4d. The corrected machining parameters can also be obtained based on, for example, a data table in which the excess or deficient machining distance $PL_2$ are associated with the correction values of the machining parameters corresponding thereto. The data table can also be previously prepared in the parameter correction portion 4d.

As the aspect of the specific correction operation in the second control form, there are also a first aspect in which the correction operation is repeatedly performed per predetermined period of interpolation in the laser machining and a second aspect in which the correction operation is performed in the correction mode before the actual laser machining. The individual aspects will be described below.

(First Aspect in Second Control Form)

A correction operation in the first aspect of the second control form will be described with reference to a flowchart shown in FIG. 8. FIG. 7 shows a case where the correction operation is performed per predetermined period of interpolation. This correction operation is performed by the control portion 4a of the scanner head control device 4.

When the laser machining device 10 is started up, the scanner head control device 4 sets preset weaving machining parameters to the weaving machining parameters before the correction (step S301). Then, the scanner head control device 4 determines whether or not the weaving machining parameters are the weaving machining parameters before the correction (step S302). Here, the weaving machining parameters are the weaving machining parameters before the correction yet. Hence, the scanner head control device 4 uses the weaving machining parameters before the correction so as to output the scanner scanning instruction to the scanner head 2 (step S303). In this way, the scanner head 2 scans the laser beam LB over the machined surface 30 of the item to be machined (step S304). Thereafter, the laser machining device 10 performs, by the movement of the scanner head 2 and the scanning of the laser beam LB based on the weaving machining parameters, the weaving machining so as to form a predetermined path in the machined surface 30 of the item to be machined.

Here, while the weaving machining is being continued, the correction operation is performed per predetermined period of interpolation. After the start of the weaving machining, the scanner head control device 4 determines whether or not the weaving machining is completed (step S305). Then, when it is determined that the weaving machining is not completed, at the subsequent predetermined period of interpolation, the scanner head control device 4 calculates, in the distance calculation portion 4c, the excess or deficient machining distance $PL_2$ at present. In this way, the scanner head control device 4 acquires the information of the excess or deficient machining distance $PL_2$ at present (step S306).

Then, the scanner head control device 4 corrects, based on the information of the excess or deficient machining distance $PL_2$, in the parameter correction portion 4d, the weaving machining parameters such that the desired machining distance $PL_0$ and the actual machining distance $PL_1$ are made equal to each other. Then, the scanner head control device 4 calculates new weaving machining parameters after the correction (step S307). The weaving machining parameters before the correction stored in the storage portion 4b are rewritten to the weaving machining parameters after the correction.

Then, the process is returned again to step S302. Here, it is determined that the weaving machining parameters are not the weaving machining parameters before the correction. Hence, the scanner head control device 4 uses the weaving machining parameters after the correction for the scanner scanning instruction which is output to the scanner head 2 (step S308). Thereafter, the processing from step S304 is repeated. The correction operation described above is repeatedly performed per predetermined period of interpolation while in step S305, the weaving machining is determined not to be completed. When in step S305, the weaving machining is determined to be completed, the scanner head control device 4 completes the correction operation.

In the laser machining device 10 according to the first aspect of the second control form, in particular, while the laser machining is being performed, the scanner head control device 4 automatically corrects the machining parameters and thereby can make the desired machining distance $PL_0$ and the actual machining distance $PL_1$ equal to each other. Hence, even when a factor which varies the machining accuracy in the laser machining occurs, this laser machining device 10 can easily cope with the factor, with the result that the laser machining device 10 can constantly perform highly accurate laser machining.

For example, the information of the period of interpolation can be set as preset values in an unillustrated interpolation period setting portion or the like in the scanner head control device 4. A configuration may be adopted in which the period of interpolation can be arbitrarily changed by an instruction of the operator.

(Second Aspect in Second Control Form)

A correction operation in the second aspect of the second control form will then be described with reference to flowcharts shown in FIGS. 9A and 9B. FIG. 9A shows an example of the flowchart in the correction mode in which the correction operation is performed before the actual laser machining. FIG. 9B shows an example of the flowchart in the machining mode in which the laser machining is actually performed after the correction is made in the correction mode. This correction operation is performed by the control portion 4a of the scanner head control device 4.

As shown in FIG. 9A, when the correction mode is entered, the scanner head control device 4 sets the preset weaving machining parameters to the weaving machining parameters before the correction (step S401). Then, the scanner head control device 4 uses the weaving machining parameters before the correction for the scanner scanning instruction which is output to the scanner head 2 (step S402) so as to output the scanner scanning instruction to the scanner head 2. In this way, the scanner head 2 scans the laser beam over the machined surface 30 of the item to be machined based on the scanner instruction (step S403). Thereafter, the laser machining device 10 performs, by the movement of the scanner head 2 and the scanning of the laser beam LB based on the weaving machining parameters, the weaving machining so as to form a predetermined path in the machined surface 30 of the item to be machined. In this weaving machining, the laser beam LB is scanned so as to form the same path as when the laser machining is actually performed on the item to be machined. However, since this weaving machining is weaving machining which serves as the correction operation, as the item to be machined here, not the item to be machined on which the laser machining is actually performed but an item to be machined for a test can be used.

After the start of the weaving machining, the scanner head control device 4 determines whether or not the weaving machining is completed (step S404). When it is determined that the weaving machining is not completed, the scanner head control device 4 repeats the processing from step S403. On the other hand, when it is determined that the weaving machining is completed, the scanner head control device 4 calculates, in the distance calculation portion 4c, the excess or deficient machining distance $PL_2$. In this way, the scanner head control device 4 acquires the information of the excess or deficient machining distance $PL_2$ (step S405).

Then, the scanner head control device 4 corrects, based on the information of the excess or deficient machining distance $PL_2$, in the parameter correction portion 4d, the weaving machining parameters such that the desired machining distance $PL_0$ and the actual machining distance $PL_2$ are made equal to each other. Then, the scanner head control device 4 calculates new weaving machining parameters after the correction (step S406). The weaving machining parameters before the correction stored in the storage portion 4b are rewritten to the weaving machining parameters after the correction. Then, the scanner head control device 4 completes the correction mode.

In this way, the new weaving machining parameters after the correction are obtained, and then, the mode is transferred to the machining mode in FIG. 9B. The machining mode is a mode in which the laser machining is actually performed on the item to be machined. In the machining mode, the scanner head control device 4 uses the weaving machining parameters after the correction obtained in the correction mode for the scanner scanning instruction which is output to the scanner head 2 (step S411). In this way, the scanner head 2 scans, based on the scanner scanning instruction, the laser beam LB over the machined surface 30 of the item to be machined (step S412). Then, the laser machining device 10 performs, by the movement of the scanner head 2 and the scanning of the laser beam LB based on the weaving machining parameters, the weaving machining as an actual machining operation so as to form a predetermined path in the machined surface 30 of the item to be machined.

Thereafter, the scanner head control device 4 determines whether or not the weaving machining is completed (step S413). While it is determined that the weaving machining is not completed, the scanner head control device 4 repeats the processing from step S412. When it is determined that the weaving machining is completed, the scanner head control device 4 completes the operation.

In the laser machining device 10 according to the second aspect of the second control form, in particular, before the laser machining, the scanner head control device 4 automatically corrects the machining parameters and thereby can make the desired machining distance $PL_0$ and the actual machining distance $PL_1$ equal to each other. Hence, this laser machining device 10 can perform highly accurate laser machining from the beginning of the start of the laser machining after the machining parameters are corrected.

For example, a configuration may be adopted in which the correction mode can be arbitrarily performed as a result of the operator selecting an unillustrated correction mode selection switch or the like provided in the scanner head control device 4 or in which the correction mode is automatically performed with predetermined timing such as when the laser machining device 10 is started up.

The laser machining device 10 descried above is formed so as to move the scanner head 2 with the robot 1. However, the laser machining device according to the present invention is not limited to this configuration. For example, the laser machining device according to the present invention may be formed so as to move the scanner head along a guide rail. The laser machining device according to the present invention is not limited at all to the configuration in which the laser beam is scanned in the zigzag-shape so as to perform the weaving machining. Furthermore, the laser machining device according to the present invention is not limited to the configuration in which the excess or deficient machining distance $PL_2$ is determined and in which thereafter the correction operation is performed without fail. For example, when the value of the calculated excess or deficient machining distance $PL_2$ falls within a range of preset threshold values, the laser machining device does not need to perform the correction operation. In this way, the laser machining device does not need to perform the unnecessary correction operation, and thus it is possible to perform highly accurate laser machining at high speed.

EXPLANATION OF REFERENCE NUMERALS

1: robot (movement means)
2: scanner head
3: robot control device (movement control device)
4: scanner head control device
10: laser machining device
LB: laser beam

What is claimed is:

1. A laser machining device comprising:
a scanner head configured to scan a laser beam;
a robot which moves the scanner head at a predetermined speed;
a scanner head control device which controls the scanner head; and
a movement control device which controls the speed of the robot,
wherein the scanner head control device controls, based on a machining parameter on a path motion, the scanner head such that the laser beam is scanned in a first direction in which the robot moves the scanner head, and also scanned in a second direction perpendicular to the first direction,
the scanner head control device includes a distance calculation portion which acquires information of a focal length and an angle θ formed by a normal direction to an item to be machined from the scanner head and a direction of application of the laser beam, and calculates, based on the acquired information, a difference between a desired machining distance and an actual machining distance, and
based on the difference calculated by the distance calculation portion:
the movement control device performs control so as to correct the speed of the robot; or
the scanner head control device performs control so as to correct the machining parameter,
such that the desired machining distance and the actual machining distance are made equal to each other.

2. The laser machining device according to claim 1, wherein the distance calculation portion of the scanner head control device calculates the difference between the desired machining distance and the actual machining distance, at a predetermined interval during laser machining, and
based on the difference calculated by the distance calculation portion:
the movement control device performs, at the predetermined interval, control so as to correct the speed of the robot; or
the scanner head control device performs, at the predetermined interval, control so as to correct the machining parameter,
such that the desired machining distance and the actual machining distance are made equal to each other.

3. The laser machining device according to claim 1, wherein the distance calculation portion of the scanner head control device calculates, before laser machining, the difference between the desired machining distance and the actual machining distance, and
based on the difference calculated by the distance calculation portion:
the movement control device performs, before the laser machining, control so as to correct the speed of the robot; or
the scanner head control device performs, before the laser machining, control so as to correct the machining parameter,
such that the desired machining distance and the actual machining distance are made equal to each other.

* * * * *